US008706911B2

(12) United States Patent
You et al.

(10) Patent No.: US 8,706,911 B2
(45) Date of Patent: Apr. 22, 2014

(54) POWER SAVING DISPLAY INFORMATION CONVERTING SYSTEM AND METHOD

(75) Inventors: Tun-Hao You, Taipei County (TW); Yi-Jui Wu, Hsinchu (TW); Hsiang-Tsung Kung, Taipei (TW); Koan-Sin Tan, Hsinchu County (TW); Chen-Hwa Song, Taipei (TW); Yi-Jen Yeh, Miaoli County (TW)

(73) Assignee: Industrial Technology Research Institute (TW)

( * ) Notice: Subject to any disclaimer, the term of this patent is extended or adjusted under 35 U.S.C. 154(b) by 355 days.

(21) Appl. No.: 13/004,455

(22) Filed: Jan. 11, 2011

(65) Prior Publication Data

US 2011/0185205 A1 Jul. 28, 2011

(30) Foreign Application Priority Data

Jan. 27, 2010 (TW) .............................. 99102296 A

(51) Int. Cl.
 *G06F 15/16* (2006.01)
 *G06F 1/32* (2006.01)
(52) U.S. Cl.
 USPC .......................................... 709/246; 713/320
(58) Field of Classification Search
 CPC .............................. G06F 1/3203; G06F 1/3265
 USPC .......................................... 709/246; 713/320
 See application file for complete search history.

(56) References Cited

U.S. PATENT DOCUMENTS

| 5,727,159 | A | * | 3/1998 | Kikinis .......................... 709/246 |
| 6,801,811 | B2 | * | 10/2004 | Ranganathan et al. ......... 700/22 |
| 6,886,013 | B1 | | 4/2005 | Beranek |
| 2007/0146344 | A1 | * | 6/2007 | Martin et al. ................. 345/173 |
| 2008/0238837 | A1 | * | 10/2008 | Yamaguchi ..................... 345/77 |
| 2010/0182332 | A1 | * | 7/2010 | Ozawa et al. ................. 345/589 |

FOREIGN PATENT DOCUMENTS

| JP | H11508715 | 7/1999 |
| JP | 2000-090001 | 3/2000 |
| JP | 2003-216092 | 7/2003 |
| JP | 2008-165653 | 7/2008 |
| JP | 2008-199972 | 9/2008 |
| JP | 2008-252185 | 10/2008 |
| TW | 591585 | 6/2004 |
| TW | 200602844 | 1/2006 |
| WO | WO2007125960 | 11/2007 |

OTHER PUBLICATIONS

Office Action dated Sep. 4, 2012 from corresponding application No. JP 2011-013363.

(Continued)

*Primary Examiner* — David X Yi

(74) *Attorney, Agent, or Firm* — Lowe Hauptman & Ham, LLP

(57) ABSTRACT

Display information to be displayed by a display device having a power consumption model is converted according to a power-saving conversion model and the power consumption model, such that the power consumption of the display device for displaying the converted display information is lower than that for displaying the original display information.

15 Claims, 9 Drawing Sheets

(56) References Cited

OTHER PUBLICATIONS

Harter et al., "Energy-Aware User Interfaces: An Evaluation of User Acceptance", CHI 2004, Apr. 24-29, 2004, Vienna Austria, pp. 1-8.
Iyer et al., "Energy-Adaptive Display System Designs for Future Mobile Environments", Proceedings of the 1st Intl. Conference on Mobile Systems, Applications, and Services, May 2003, San Francisco, CA.
Shim et al., "Power Saving in Hand-held Multimedia Systems Using MPEG-21 Digital Item Adaptation", Proceedings of Workshop on Embedded Systems for Real-Time Multimedia, pp. 13-18, 2004.
Office Action dated Jan. 8, 2013 from corresponding application No. JP 2011-013363.
Office Action dated Oct. 8, 2013 from corresponding application No. JP 2011-013363.
Office Action dated Jan. 22, 2014 from corresponding application No. TW 100103139.

\* cited by examiner

POWER SAVING DISPLAY INFORMATION CONVERTING SYSTEM AND METHOD

CROSS-REFERENCE TO RELATED APPLICATIONS

The present application claims priority of TW Patent Application Serial No. 99102296, filed on Jan. 27, 2010, which is incorporated herein by reference in its entirety.

1. Technical Filed

The present disclosure relates to a power-saving display information converting system and method.

2. Background

An organic light-emitting diode (OLED) display is a self-emissive device and offers a high contrast ratio, a wide viewing angle, and a thin-body implementation. Thus, in recent years, many display manufacturers have placed their focus on the development of OLED displays.

The power consumed by an OLED display is a function of the displayed image when running at a fixed voltage, because the light intensity of an OLED is proportional to the current magnitude. This differs from the thin film transistor liquid crystal display (TFT-LCD) where the power consumed is mostly determined by the intensity of the backlight, and is generally independent of the content to be displayed. For example, while consuming no power when displaying a dark image, an OLED display may consume several times more power than a comparable TFT-LCD when displaying a bright image.

Most existing application programs' graphical user interfaces and web pages provide a color theme with a light background and dark foreground, e.g., black glyphs on white background. Since the entire image presents a high degree of brightness, much more power will be consumed when an OLED display is used instead of a TFT-LCD. This calls for techniques of converting display images for reduced power consumption of OLED displays.

SUMMARY

An exemplary embodiment of the present disclosure provides a hardware proxy server including a processor. The processor receives display information to be displayed by a display device, converts the display information according to a power-saving conversion model and a power consumption model of the display device, and provides the resulting converted display information to the display device. According to the power consumption model, the power consumption of the display device for displaying the converted display information is lower than that for displaying the original display information.

An exemplary embodiment of the present disclosure also provides a display information converting system including a display device and a proxy server as disclosed above.

An exemplary embodiment of the present disclosure further provides a display information converting method or a computer-readable medium containing thereon computer-executable instructions for configuring a computer as a proxy server for performing the method. The method includes the following steps: receiving display information to be displayed by a display device having a power consumption model, converting the received display information according to a power-saving conversion model and the power consumption model, and providing the converted display information to the display device. According to the power consumption model, the power consumption of the display device for displaying the converted display information is lower than that for displaying the original display information.

DETAILED DESCRIPTION

Figure 1:
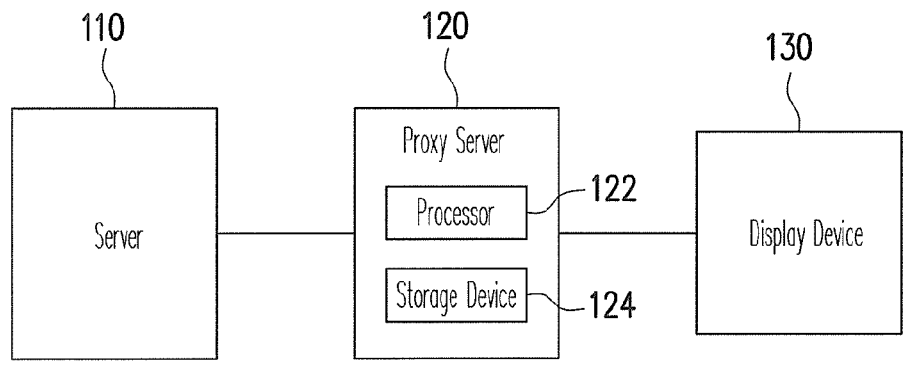
FIG. 1 is a schematic diagram of a display information converting system according to one or more embodiments of the present disclosure.

Exemplary embodiments will now be described with reference to the accompanying drawings. Wherever possible, the same reference numbers are used in the drawings and the description to refer to the same or like parts.

FIG. 1 is a diagram of a display information converting system according to one or more embodiments of the present disclosure. Referring to FIG. 1, the display information converting system includes a server 110, a proxy server 120, and a display device 130.

The server 110 in some embodiments is a web server, an X Window System server, or other types of servers. The server 110 provides display information to the proxy server 120. The display information describes or defines the image content, for example, the content of a web page or the user interface of an application program, to be displayed by the display device 130.

The proxy server 120 in some embodiments includes a processor 122 and a storage device 124. The processor 122 executes a display information converting method as will be described herein after with reference to FIG. 3 to convert the display information provided by the server 110 into a power-saving version and provide the converted display information to the display device 130. The storage device 124 stores a power consumption model and a power-saving conversion model for use by the processor 122 for converting the display information.

The display device 130 in some embodiments has an organic light-emitting diode (OLED) display panel for displaying an image according to the converted display information. However, the present disclosure is not limited to an OLED display, and in other embodiments, the display device 130 includes any pixel self-emissive display device.

In some embodiments, the server 110 is connected to the proxy server 120 via a two-way data communications link to carry data to and from the server 110 and proxy server 120. In one or more embodiments, the two-way data communications link between the server 110 and proxy server 120 includes a network connection, such as a dial-up connection via a telephone line, a wide area network (WAN) connection, a local area network (LAN) connection, an Internet connection, a wireless LAN (WLAN) connection, a cellular network connection, a satellite link or any combination thereof. In one or more embodiments, the two-way data communications link between the server 110 and proxy server 120 includes a direct connection, which includes a wired connection, such as a universal serial bus (USB) connection, or a wireless connection, such as a Bluetooth® connection. Other arrangements are within the scope of this disclosure.

In some embodiments, the proxy server 120 includes a standalone device, e.g., a computer system or a server, connected at any point between the server 110 and the display device 130. The proxy server 120 is connected to the server 110 and the display device 130 by one or more of the two-way data communications link described herein. An exemplary configuration of a standalone proxy server 120 has been disclosed in the foregoing description with respect to FIG. 1.

In some embodiments, the proxy server 120 includes a program residing in and executed by any one of the server 110, the display device 130, or a middlebox device, such as a gateway, a router, or a modem, connected at any point between the server 110 and the display device 130. The proxy server 120 as software residing in another device requires, in one or more embodiments, no independent processor 122 or storage device 124, because the proxy software and other programs can share the processor and storage on the device. Data required for the operation of the proxy server 120, such as a power-saving conversion model, is stored in storage of the device in which the proxy server 120 resides.

In some embodiments, the display device 130 includes a display screen of a host device, such as a computer monitor of a desktop or laptop computer, or a screen of a cell phone or any other handheld device. The host device, such as a desktop computer, a laptop computer, or a handheld device, is connected to the server 110 via one or more of the two-way data communications links. As disclosed herein, the proxy server 120 is connected at any point between the server 110 and the host device, or resides in any of the server 110, the host device, or a middlebox device.

In some embodiments, the display device 130 includes a standalone display screen, such as an Internet-enabled TV that is connectable to the server 110 via an Internet connection. Again, the proxy server 120 is connected at any point between the server 110 and the standalone display screen, or resides in any of the server 110, the standalone display screen, or a middlebox device.

The display information provided by the server 110 includes at least one of an image or an image descriptor, or both. The image in some embodiments is from a digital image or video file, or an image drawn in a frame buffer. The image in the display information is to be directly displayed by the display device 130 after a power-saving display information conversion by the proxy server 120.

The image descriptor in some embodiments includes markup language code, program code, or color theme configuration code. The markup language code in one or more embodiments includes the HyperText Markup Language (HTML) or the Extensible Markup Language (XML). The program code in one or more embodiments includes a piece of code for generating an image, such as graphics device interface (GDI) instructions of the Windows® operating system. The color theme configuration code in one or more embodiments includes any configuration code for determining the color theme of an image. The content of a desktop theme configuration file in the Windows® operating system is an example of the color theme configuration code. The image descriptor is processed by the software or hardware of the display device 130 to generate an image to be displayed by the display device 130.

Each display device has its own corresponding power consumption model. The information or data provided by a power consumption model includes the power levels consumed by a pixel of the display device for displaying various levels of brightness and various colors. The processor 122 calculates the power consumed by the display device 130 for displaying the display information provided by the server 110 by using the power consumption model of the display device 130. In at least some embodiments, the power consumption model is obtained from the power consumption data provided by the manufacturer of the display device 130 or from an actual power consumption measurement of the display device 130. As discussed above, in some embodiments, the power consumption model of the display device 130 is stored in the storage device 124 of the proxy server 120. However, in further embodiments, the power consumption model of the display device 130 is stored at the server 110, the display device 130, or storage elsewhere on the network that connects the server 110 and the display device 130.

Figure 2:
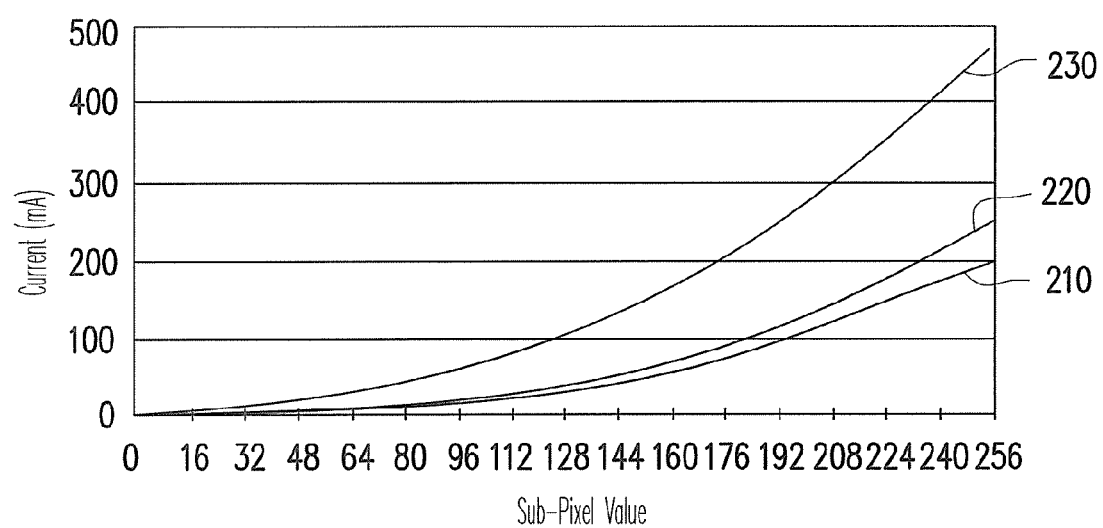
FIG. 2 shows a power consumption model of a display device.

FIG. 2 illustrates exemplary current consumption curves of the display device 130. The display device 130 in the specifically disclosed configuration has a resolution of 800*480 pixels, wherein each of the pixels is composed of a red sub-pixel, a green sub-pixel, and a blue sub-pixel. The current consumption of the display device 130 when the display device 130 displays a single color is illustrated in FIG. 2, wherein the curves 210, 220, and 230 represent the current consumption corresponding to red, green, and blue sub-pixels, respectively. The current consumed by a single pixel for displaying any color at any sub-pixel value is obtainable by dividing the current corresponding to the curves 210, 220, and 230 by 800*480. Because an OLED display has a fixed pixel driving voltage, the power consumption of each pixel is in direct proportion to the current consumption. Namely, the power consumption of each pixel is determined by the color and brightness being displayed. The power consumption of each pixel in an image is obtainable according to the display information, and the total power consumption of the entire image is obtainable by adding up the power consumption of the pixels.

Figure 3:
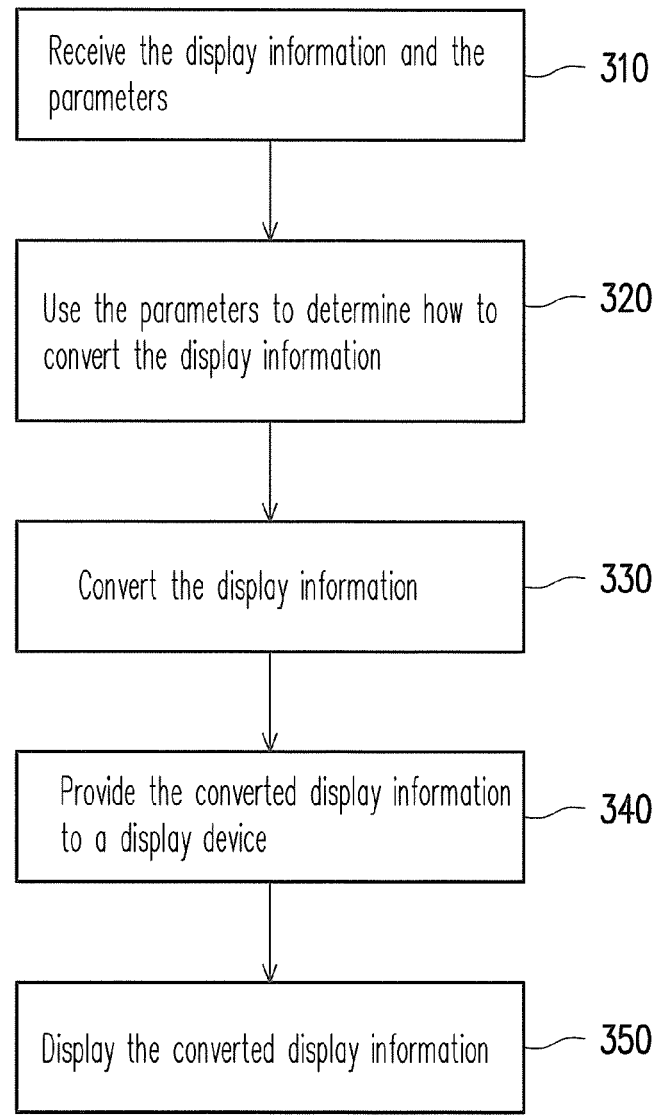
FIG. 3 is a flowchart of a display information converting method according to one or more embodiments of the present disclosure.

FIG. 3 is a flowchart of the display information converting method executed by the processor 122. First, at step 310, the display information and the parameters are received from the server 110, wherein the parameters are determinable by the user, i.e., the parameters may be predetermined parameters, or are obtained from the display device, or both. These parameters may include the remaining battery capacity of the display device, the remaining usage time of the display device, the desired time-of-use of the display device, the total amount of power consumed for displaying the display information, a user's preferences in display information conversion, the power budget of the display device, and so on.

The power-saving conversion model uses the parameters to determine how to covert the display information at step 320. The details include the method, for example, one or more of the methods specifically disclosed herein with respect to FIG. 4, used for converting the display information received from the server 110. The details also include which images or image descriptors are to be converted and restrictions to the conversion result, for example, what colors the background and foreground of documents are converted into or whether the tone of an image is allowed to be changed or not when the image is converted. The details further include the user's requirement with respect to the conversion extent; for example, the user requires the power consumed for displaying the display information to be lower than a predetermined value.

In an embodiment of present invention, for example, a user uses a handheld device with a battery power supply to surf on the Internet. The operating system of the handheld device prompts the user that it can last less than 30 minutes with the remaining battery capacity. However, the user wants an extra hour to finish his/her work. Then, the power-saving conversion model uses the parameters, such as the remaining battery capacity, the desired time-of-use, the total amount of power consumed for displaying the display information, the user's preferences in display information conversion, the power budget of the display device, to convert the display information to a power-saving one, to extend the amount of remaining usage time of the display device.

Next, the processor 122 converts the received display information according to the power-saving conversion model and the power consumption model at step 330 and provides the converted display information to the display device 130 at step 340. The display device 130 then displays the converted display information at step 350. Through the conversion of the proxy server 120, the power consumption of the display device 130 for displaying the converted display information is lower than that for displaying the original display information.

The display information includes at least one of an image or an image descriptor. Thus, the power-saving conversion model in one or more embodiments includes a corresponding image conversion model, a corresponding image descriptor conversion model, or both. The image conversion model in one or more embodiments further includes one or more of a brightness reduction model, a color conversion model, or both. The image descriptor conversion model in one or more embodiments further includes one or more of a color theme conversion model, an image descriptor dimming model, an image descriptor resizing model, an image descriptor removing model, or any combination of the above models. These models contain various algorithms for converting the display information.

Figure 4:
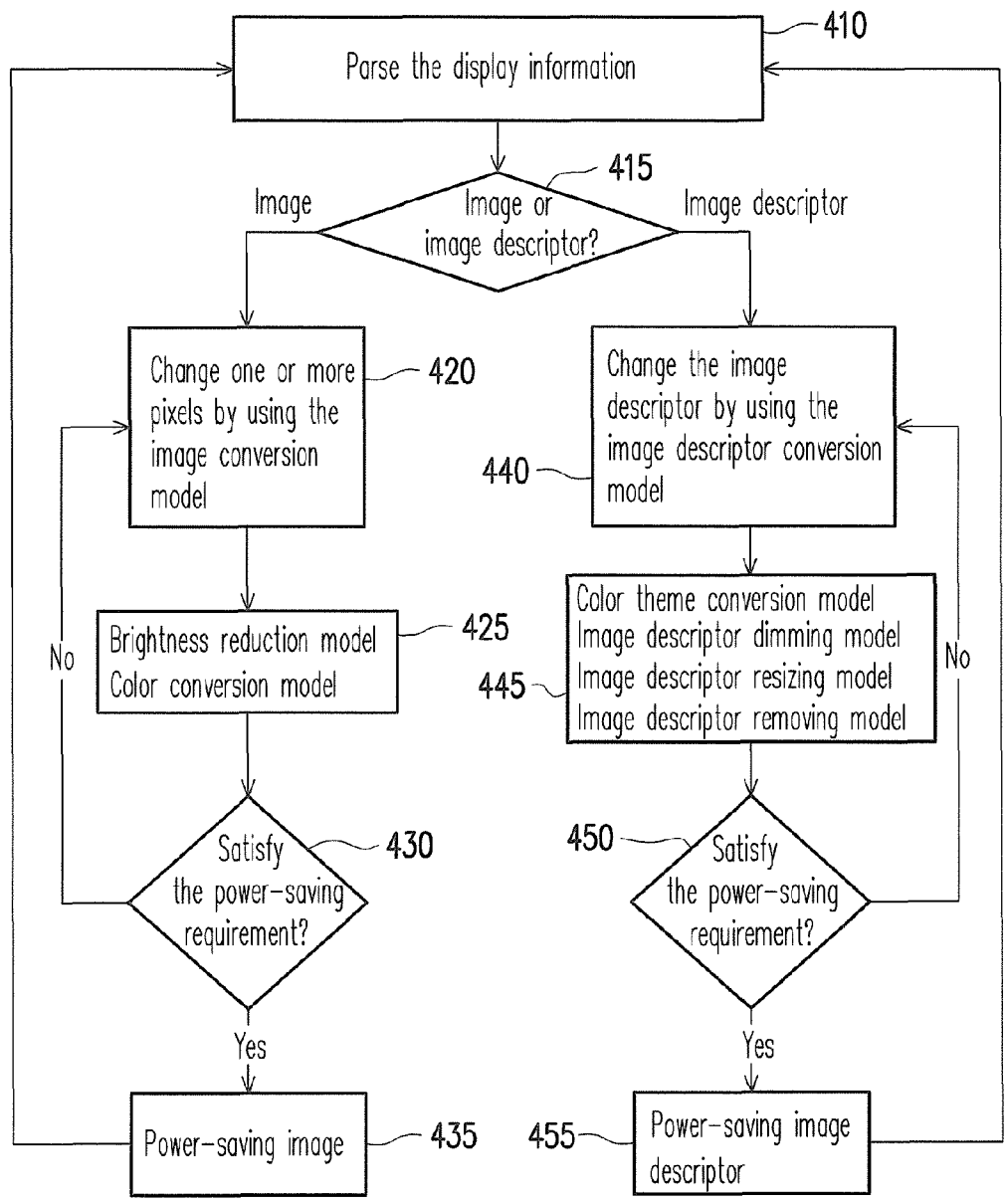
FIG. 4 is a detailed flowchart of the display information converting step in FIG. 3.

FIG. 4 is a detailed flowchart of step 330 in FIG. 3, where one or more of the foregoing conversion models are used. First, the power-saving conversion model parses the display information recursively at step 410. Then, whether the display information includes an image or an image descriptor is determined at step 415. If the display information includes an image, at step 420, use the image conversion model to change one or more pixels in the image. To be specific, the pixel brightness, e.g., sub-pixel value in FIG. 2, is reduced by using the brightness reduction model so as to reduce the power consumption at step 425.

Alternatively or additionally the pixel color is converted into a power-saving color by using the color conversion model at step 425, wherein the power-saving color, according to the power consumption model, requires less power to display than the pixel color to be changed. For example, the pixel color is shifted toward the green or red color and away from the blue color to reduce the power consumption, because as illustrated in FIG. 2 the blue color requires more power to display than the green and red color. Note that for a different display device where the red or green requires more power to display than the other primary colors, the pixel color will be shifted in accordance with the color conversion model away from the red or green color.

Figure 5A:
FIGS. 5-10 illustrate examples of display information conversion according to one or more embodiments of the present disclosure.
Figure 5B:
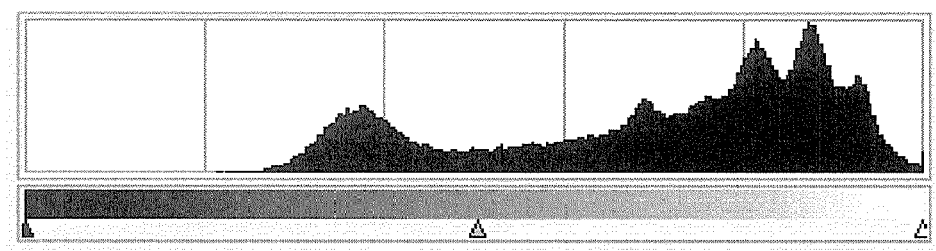
Figure 6A:
Figure 6B:
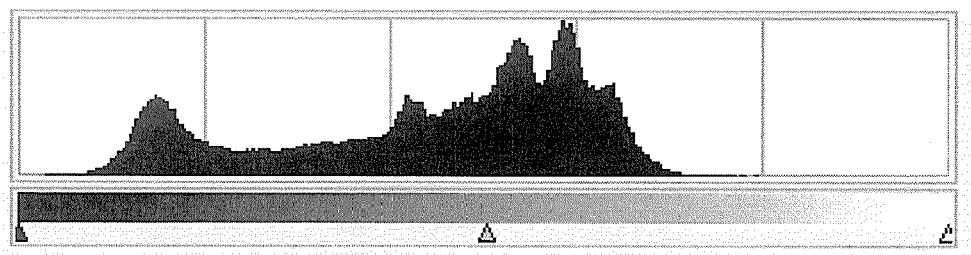

In the example illustrated in FIG. 5A, FIG. 5B, FIG. 6A, and FIG. 6B, the original image in FIG. 5A is converted into an image with lower power consumption color(s) and, as shown in FIG. 6A. FIG. 5B shows the color histogram of the original image in FIG. 5A, while FIG. 6B shows the color histogram of the converted image in FIG. 6A. As shown in FIG. 5B and FIG. 6B, the colors of the original image in FIG. 5A are shifted toward the darker end to obtain the converted image in FIG. 6A. In this example, displaying the original image in FIG. 5A consumes 2110 mW, whereas displaying the converted image in FIG. 6A consumes only 931 mW.

Next, at step 430, the processor 122 calculates whether the power consumption of the converted display information satisfies the power-saving requirement appointed or predetermined by the user by using the power consumption model of the display device 130. For example, the requirement is satisfied when the proxy server 120 determines that the converted display information saves a predetermined percentage, e.g., about 20 percent of power consumption over the original display information. If the converted display information does not satisfy the power-saving requirement, step 420 is executed again to further convert the display information by using the image conversion model. For example, the pixel brightness is further reduced or the pixel color is further shifted toward the lower power consumption color(s), e.g., red or green. Otherwise, at step 435, when the converted display information satisfies the power-saving requirement, a power-saving image is output to the display device 130. Next, the flow returns to step 410 to continue the parsing of the display information.

Figure 7:
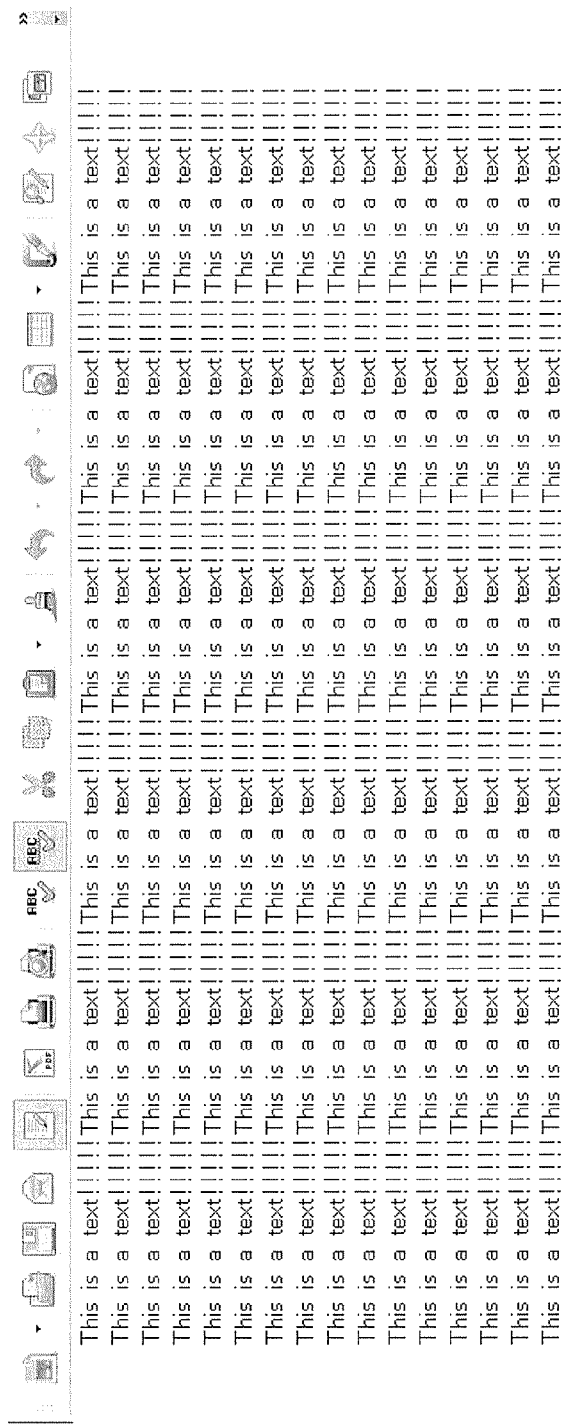
Figure 8:
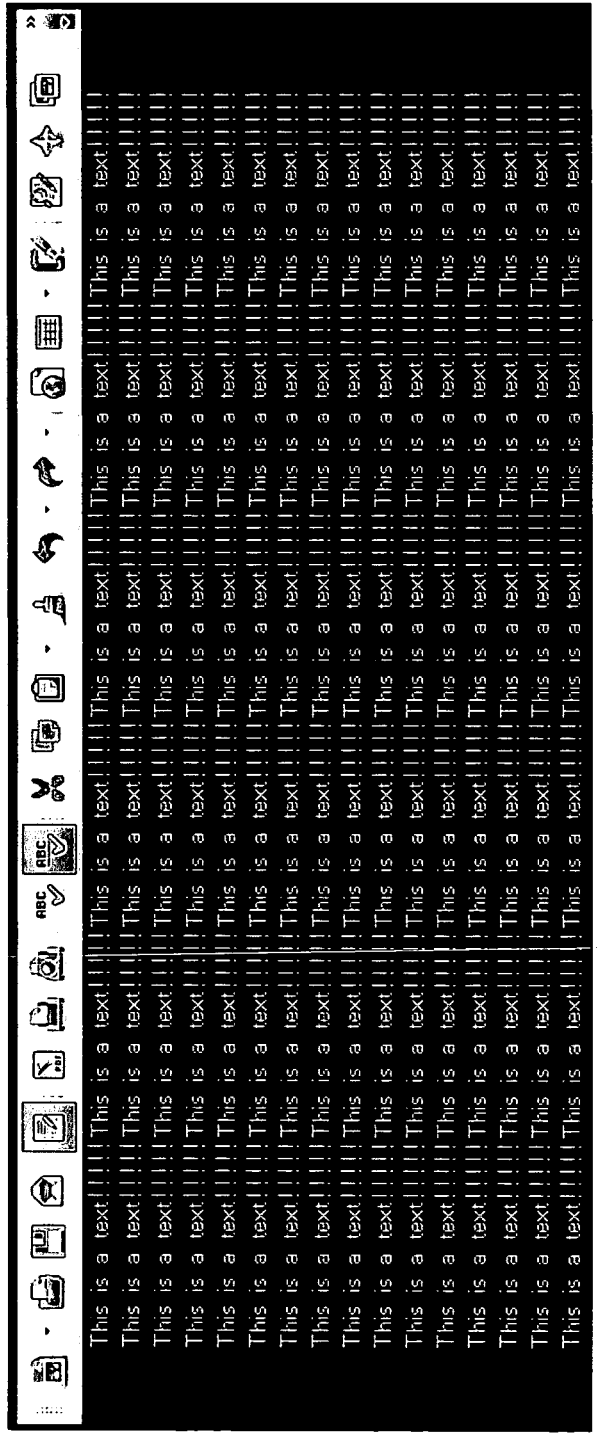

If it is determined in step 415 that the display information includes an image descriptor, the content of the image descriptor is converted by using the image descriptor conversion model at step 440. To be specific, the original color theme defined by the image descriptor is converted into a power-saving color theme by using the color theme conversion model at step 445, the power-saving color theme, according to the power consumption model, requires less power to display than the original color theme. Most existing application programs' graphical user interfaces and web pages provide a color theme with light background and dark foreground, e.g. black glyphs on white background. Since the entire display information presents a high degree of brightness, much more power will be consumed. For example, one embodiment of the present disclosure as shown in FIG. 7 and FIG. 8, the text display of an application program is converted from the white background and black glyphs in FIG. 7 into the black background and grey glyphs in FIG. 8. Because a black background consumes almost no power, such a conversion saves a lot of power with respect to the white background.

Figure 9:
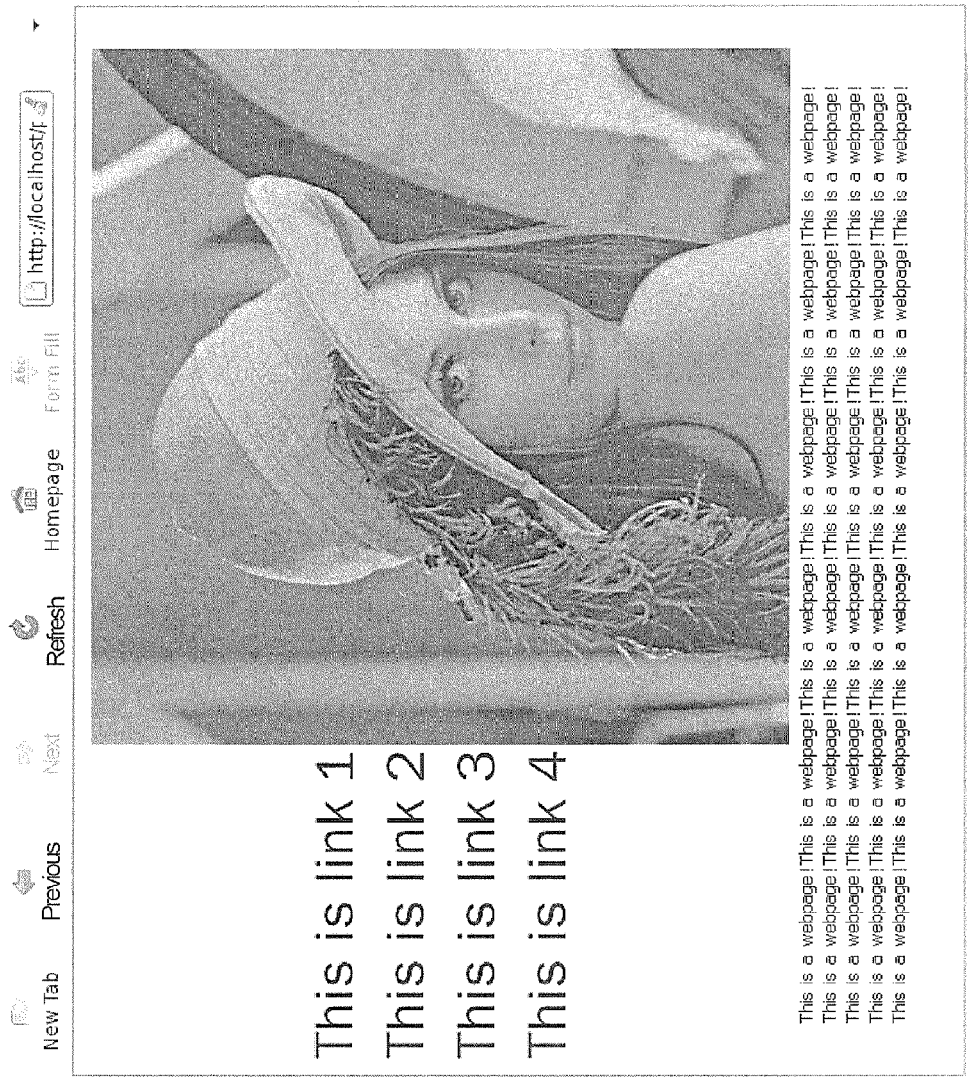
Figure 10:
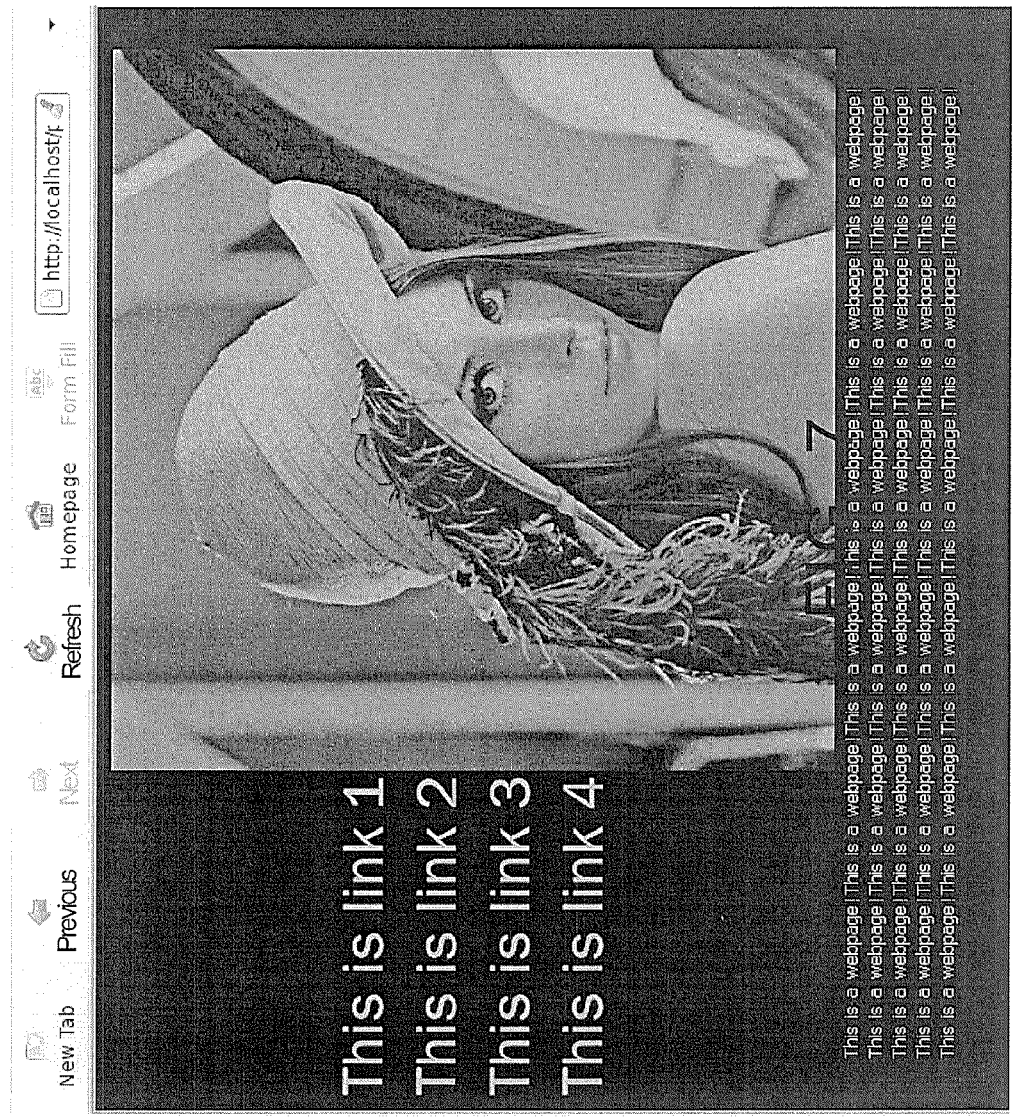

Alternatively or additionally, the brightness defined by the image descriptor is reduced by using the image descriptor dimming model at step 445. For example, as shown in FIG. 9 and FIG. 10, in the web page, the piece of markup language code which generates a light color background is converted to a new one which generates a dark color background.

Alternatively or additionally, the display size defined by the image descriptor, e.g., the headings and pictures in a web page, is reduced by using the image descriptor resizing model at step 445.

Alternatively or additionally, an image descriptor, e.g., a piece of code for generating advertisements, is removed by using the image descriptor removing model at step 445. Thus, the number of emissive pixels is reduced and accordingly the power consumption of the display device 130 is also reduced.

Thereafter, the processor 122 comprising a power consumption model of the display device 130 calculates whether the converted display information satisfies a power-saving requirement appointed or predetermined by a user, at step 450. If the converted display information does not satisfy the power-saving requirement, step 440 is executed to further convert the display information by using the image descriptor conversion model. Otherwise, when the converted display information satisfies the power-saving requirement, a power-saving image descriptor is output to the display device 130 at step 455. Next, the flow returns to step 410 to continue the parsing of the display information.

The storage device 124 of the proxy server 120 in some embodiments stores more than one power-saving conversion model. These power-saving conversion models in one or more embodiments are provided by a manufacturer, a provider, a designer or an administrator of the proxy server 120, a manufacturer of the display device 130, the user of the display device 130, or, alternatively or additionally, other users who have prior experience on the display device 130 or any other pixel self-emissive devices. In some embodiments, a user is provided with the capability to select the most suitable power-saving conversion model from all the power-saving conversion models or to customize a pre-existing power-saving conversion model to his/her need.

Note again that although the proxy server 120 is illustrated in FIG. 1 as hardware equipment, the proxy server 120 in some embodiments is implemented as software residing in hardware equipment, such as the server 110, the display device 130 or any other middlebox device. Further embodiments include a computer-readable medium, such as a CD, a DVD, a flash drive, a memory card, or an external hard drive, containing therein computer-executable instructions for causing a computer, such as the server 110, the display device 130 or any other middlebox device to function as the proxy server 120 disclosed herein. The computer-readable medium comprises a physical storage medium for storing one or more sets of instructions for execution or interpretation by a processor.

The display information converting system and the proxy server described above can reduce the power consumption of a self-emissive display device, such as an OLED display. The proxy server can process the display information from multiple servers and multiple users so that a user needs not to modify the source code of application programs and web pages one by one or install any plug-in for every web browser.

In some embodiments where the operation resources and power consumed for converting the display information are taken care of by the proxy server rather than the display device 130, the display device 130 does not need to consume any additional resource or power to convert the display information.

In some embodiments, the proxy server temporarily stores the converted display information, so that the display information is converted only at the first time it is requested. When the display information is requested later on, the proxy server will send out the converted one instead. Thus, the efficiency of the entire system is improved.

In some embodiments where application programs are web-based and run on an Internet application server rather than at the user end, the user interfaces of all application programs are converted all together by disposing the proxy server described above between the application server and the user end, so that the power consumption of all users is reduced. In addition, cloud computing is shaping up as the current trend. If in the future application programs are to be shifted from a user end to Internet application server, the user interfaces of all application programs could be converted all together by disposing the proxy server described above between the application server and the user end, so that the power consumption of all users can be reduced.

In some embodiments where the power consumption model of a self-emissive display device is provided by the manufacturer or a user of the display device, the proxy server can support different display devices in the market. In order to provide a comfortable vision to a user, different processing techniques in various embodiments are adopted according to the characteristics of the display panels along with different power-saving conversion models provided by the user. Moreover, in various embodiments, different power-saving conversion models are provided to be selected or edited by each user.

It will be apparent to those skilled in the art that various modifications and variations can be made without departing from the scope or spirit of the present disclosure. In view of the foregoing, it is intended that the present disclosure cover modifications and variations that fall within the scope of the following claims and their equivalents.

What is claimed is:

1. A hardware proxy server, comprising:
   a processor configured for
      receiving display information to be displayed by a display device having a power consumption model;
      converting the received display information according to a power-saving conversion model and the power consumption model; and
      providing the converted display information to the display device,
      wherein, according to the power consumption model, power consumption of the display device for displaying the converted display information is lower than that for displaying the display information received by the proxy server,
   wherein the power-saving conversion model comprises at least one of an image conversion model or an image descriptor conversion model,
   wherein the image conversion model comprises at least one of:
      a brightness reduction model, for reducing a pixel brightness of at least one pixel of an image of the display information; or
      a color conversion model, for converting an original pixel color of said at least one pixel of the image into a power-saving color which, according to the power consumption model, requires less power to display than the original pixel color, and
   wherein the image descriptor conversion model comprises at least one of:
      a color theme conversion model, for converting an original color theme defined by at least one image descriptor of the display information into a power-saving color theme which, according to the power consumption model, requires less power to display than the original color theme;
      an image descriptor dimming model, for reducing brightness defined by said at least one image descriptor;
      an image descriptor resizing model, for reducing a display size defined by said at least one image descriptor; or
      an image descriptor removing model, for removing said at least one image descriptor.

2. The proxy server according to claim 1, wherein the at least one image descriptor includes at least one of markup language code, program code, or color theme configuration code.

3. The proxy server according to claim 1, further comprising
   a storage device for storing at least one of the power-saving conversion model or the power consumption model.

4. The proxy server according to claim 1, wherein
   the power consumption model contains data on power consumption of the display device for displaying various colors at various brightness; and the processor is configured to calculate power consumption of the display device for displaying the received or converted display information by using said data of the power consumption model.

5. A display information converting system, comprising:
a display device having a power consumption model; and
a proxy server coupled to the display device for
receiving display information to be displayed by the display device;
converting the received display information according to a power-saving conversion model and the power consumption model; and
providing the converted display information to the display device,
wherein, according to the power consumption model, power consumption of the display device for displaying the converted display information is lower than that for displaying the display information received by the proxy server,
wherein the power-saving conversion model comprises at least one of an image conversion model or an image descriptor conversion model,
wherein the image conversion model comprises at least one of:
a brightness reduction model, for reducing a pixel brightness of at least one pixel of an image of the display information; or
a color conversion model, for converting an original pixel color of said at least one pixel of the image into a power-saving color which, according to the power consumption model, requires less power to display than the original pixel color, and
wherein the image descriptor conversion model comprises at least one of:
a color theme conversion model, for converting an original color theme defined by at least one image descriptor of the display information into a power-saving color theme which, according to the power consumption model, requires less power to display than the original color theme;
an image descriptor dimming model, for reducing brightness defined by said at least one image descriptor;
an image descriptor resizing model, for reducing a display size defined by said at least one image descriptor; or
an image descriptor removing model, for removing said at least one image descriptor.

6. The display information converting system according to claim 5, wherein the display device is a pixel self-emissive display device.

7. A display information converting method, comprising:
receiving display information to be displayed by a display device having a power consumption model;
converting the received display information according to a power-saving conversion model and the power consumption model; and
providing the converted display information to the display device,
wherein, according to the power consumption model, power consumption of the display device for displaying the converted display information is lower than that for displaying the received display information, and
wherein said converting comprises at least one of:
reducing a pixel brightness of at least one pixel of an image of the display information by using a brightness reduction model,
converting an original pixel color of said at least one pixel of the image into a power-saving color by using a color conversion model, wherein the power-saving color, according to the power consumption model, requires less power to display than the original pixel color,
converting an original color theme defined by at least one image descriptor of the display information into a power-saving color theme by using a color theme conversion model, wherein the power-saving color theme, according to the power consumption model, requires less power to display than the original color theme,
reducing brightness defined by said at least one image descriptor by using an image descriptor dimming model,
reducing a display size defined by said at least one image descriptor by using an image descriptor resizing model, or
removing said at least one image descriptor by using an image descriptor removing model.

8. The display information converting method according to claim 7, between receiving the display information and converting the received display information, further comprising:
receiving a plurality of parameters; and
using the parameters and the power-saving conversion model in said converting the display information.

9. The display information converting method according to claim 7, wherein
the power consumption model contains data on power consumption of the display device for displaying various colors at various brightness; and
said converting comprises calculating power consumption of the display device for displaying the received and converted display information by using said data.

10. The display information converting method according to claim 7, wherein said converting further comprises
determining whether the converted display information satisfies a predetermined power-saving requirement; and
if it is determined that the converted display information does not satisfy the predetermined power-saving requirement, repeating at least one of
said reducing the pixel brightness of said at least one pixel,
said converting the original pixel color of said at least one pixel,
said converting the original color theme defined by said at least one image descriptor,
said reducing brightness defined by said at least one image descriptor,
said reducing the display size defined by said at least one image descriptor, or
said removing said at least one image descriptor.

11. The display information converting method according to claim 7, wherein said converting further comprises at least one of
shifting the color of the image to a lower consumption color;
converting a color theme defined by said at least one image descriptor from a darker foreground with lighter background to a lighter foreground with darker background; or
reducing brightness of the image.

12. The display information converting method according to claim 7, further comprising:
   obtaining the power-saving conversion model from:
   a manufacturer of the proxy server;
   a provider of the proxy server;
   a manufacturer of the display device;
   an administrator of the proxy server;
   a user of the display device; or
   other users; and
   obtaining the power consumption model from:
   power consumption data provided by a manufacturer of the display device; or
   an actual power consumption measurement of the display device.

13. The display information converting method according to claim 7, further comprising:
   storing a plurality of power-saving conversion models; and
   providing the display device with a capability to select at least one power-saving conversion model from the plurality of power-saving conversion models to be used in said converting.

14. The display information converting method according to claim 8, wherein the plurality of parameters specifies various information items including a user's preferences in display information conversion and power budget of the display device.

15. A non-transitory computer readable medium containing thereon computer-executable instructions for configuring, when executed by a computer, the computer as a proxy server for performing the method of claim 7.

* * * * *